(12) United States Patent
Kwon et al.

(10) Patent No.: US 8,835,057 B2
(45) Date of Patent: Sep. 16, 2014

(54) ANODE FOR SECONDARY BATTERY AND SECONDARY BATTERY HAVING THE SAME

(71) Applicant: LG Chem, Ltd., Seoul (KR)

(72) Inventors: Yo-Han Kwon, Daejeon (KR); Byung-Hun Oh, Daejeon (KR); Dong-Sub Jung, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/187,740

(22) Filed: Feb. 24, 2014

(65) Prior Publication Data

US 2014/0170453 A1    Jun. 19, 2014

Related U.S. Application Data

(63) Continuation of application No. PCT/KR2012/008822, filed on Oct. 25, 2012.

(30) Foreign Application Priority Data

Oct. 25, 2011  (KR) .......... 10-2011-0109562
Oct. 25, 2012  (KR) .......... 10-2012-0118938

(51) Int. Cl.
*H01M 4/70* (2006.01)
*H01M 4/76* (2006.01)
*H01M 6/08* (2006.01)

(52) U.S. Cl.
USPC ............ 429/238; 429/164; 429/209; 429/233

(58) Field of Classification Search
None
See application file for complete search history.

(56) References Cited

U.S. PATENT DOCUMENTS

| | | |
|---|---|---|
| 2012/0009331 A1 | 1/2012 | Kwon et al. |
| 2012/0015233 A1 | 1/2012 | Kwon et al. |
| 2012/0015239 A1 | 1/2012 | Kwon et al. |
| 2012/0058376 A1 | 3/2012 | Kwon et al. |

FOREIGN PATENT DOCUMENTS

| | | |
|---|---|---|
| JP | 2001-110445 A | 4/2001 |
| KR | 20070009231 A | 1/2007 |
| KR | 20110089519 A | 8/2011 |
| KR | 20110089583 A | 8/2011 |
| KR | 20110089584 A | 8/2011 |
| KR | 20110089819 A | 8/2011 |
| KR | 20110090768 A | 8/2011 |

OTHER PUBLICATIONS

International Search Report for Application No. PCT/KR2012/008821 dated Mar. 15, 2013.

*Primary Examiner* — Cynthia K. Walls
(74) *Attorney, Agent, or Firm* — Lerner, David, Littenberg, Krumholz & Mentlik, LLP

(57) ABSTRACT

The present invention relates to an anode for a secondary battery, comprising: a spiral anode having at least two anode wires which are parallel to each other and spirally twisted, each of the anode wires having an anode active material layer coated on the surface of a wire-type current collector; and a conductive layer formed to surround the spiral anode.
The anode active material layer of the spirally-twisted has a thin thickness as compared with a single strand of an anode having the same anode active material. Therefore, Li ions can be easily diffused to enhance battery performance. Also, the anode of the present invention has a conductive layer on the surface thereof to prevent or alleviate the release of an anode active material which is caused by volume expansion during charging and discharging processes, and to solve the isolation of the anode active material.

20 Claims, 2 Drawing Sheets

ANODE FOR SECONDARY BATTERY AND SECONDARY BATTERY HAVING THE SAME

CROSS-REFERENCE TO RELATED APPLICATION(S)

This application is a continuation of International Application No. PCT/KR2012/008822 filed on Oct. 25, 2012, which claims priority from Korean Patent Application No. 10-2011-0109562 filed in the Republic of Korea on Oct. 25, 2011 and Korean Patent Application No. 10-2012-0118938 filed in the Republic of Korea on Oct. 25, 2012, the disclosures thereof are incorporated herein by reference.

TECHNICAL FIELD

The present invention relates to an anode which is suitably used in secondary batteries, more specifically an anode having a spiral anode and a conductive layer, and a secondary battery comprising the anode.

BACKGROUND ART

Secondary batteries are devices which store electrical energy in a chemical form and generate electricity when needed. The secondary batteries are also referred to as rechargeable batteries because they can be charged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipments to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and the casing is filled with electrolyte. Because a predetermined mounting space for the electrode assembly is necessary in this process, the cylindrical, prismatic or pouch shape of the secondary batteries has a limitation in developing various shapes of mobile devices. Accordingly, there is a need for secondary batteries having a new structure that is variously adaptable in shape. To fulfill this need, suggestions have been made to develop flexible linear secondary batteries having a very high ratio of a length relative to a cross-sectional diameter, hereinafter referred to as cable-type secondary batteries.

However, the flexible cable-type secondary batteries are frequently subject to the external physical impact due to their structural characteristics, for example, the twist thereof, which may result in a short circuit. Further, when Si or Sn is used as an anode active material, the active material may peel off due to the expansion and shrinkage of electrodes caused by the repeated charging and discharging. Also, when an anode active material layer made of a metal, which is used to increase the capacity of batteries, is thick, it is difficult for lithium ions to diffuse in the anode active material layer, thereby substantially restricting the capacity of batteries.

DISCLOSURE

Technical Problem

The present invention is designed to solve the above-mentioned problems, and therefore it is an object of the present invention to provide an anode for a secondary battery, having a spirally twisted form, which can exhibit good electrochemical reactivity and excellent resistance to stress and pressure applied in the battery.

Technical Solution

In order to accomplish the above object, in accordance with one aspect of the present invention, there is provided an anode for a secondary battery, comprising: a spiral anode having at least two anode wires which are parallel to each other and spirally twisted, each of the anode wires having an anode active material layer coated on the surface of a wire-type current collector; and a conductive layer formed to surround the spiral anode.

Preferably, the twist rate of the anode wires in the spiral anode is in the range of 0.01 to 10 mm per one twist.

In the present invention, the wire-type current collector is not particularly limited to its kinds, and for example, it may be made of stainless steel, aluminum, nickel, titanium, sintered carbon, copper; stainless steel treated with carbon, nickel, titanium or silver on the surface thereof; an aluminum-cadmium alloy; a non-conductive polymer treated with a conductive material on the surface thereof; or a conductive polymer.

The conductive material is not particularly limited to its kinds, and for example, it may be selected from polyacetylene, polyaniline, polypyrrole, polythiophene, polysulfur nitride, indium thin oxide (ITO), copper, silver, palladium, nickel and a mixture thereof.

Also, the conductive polymer may be selected from polyacetylene, polyaniline, polypyrrole, polythiophene, polysulfur nitride and a mixture thereof, but is not limited thereto.

The anode active material layer may comprise a metal (Me) such as Si, Sn, Li, Zn, Mg, Cd, Ce, Ni and Fe, an alloy containing the metal (Me), an oxide ($MeO_x$) of the metal (Me), or a composite of the metal (Me) and carbon, but is not particularly limited thereto.

In the present invention, the conductive layer comprises a mixture of carbon particles and a polymer binder.

The carbon particles are not particularly limited to its kinds, and for example, they may be selected from the group consisting of carbon black, acetylene black, ketjen black, denka black, carbon fiber and a mixture thereof.

In addition, the polymer binder is not particularly limited to its kinds, and for example, it may be selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, styrene-butadiene rubber, carboxymethyl cellulose and a mixture thereof.

Further, the present invention provides a secondary battery comprising a cathode, the above-mentioned anode and a separation layer, and the secondary battery may be a cable-type secondary battery, comprising: an inner electrode having at least one anode as mentioned above; a separation layer surrounding the inner electrode and acting as a ion channel; an outer electrode surrounding the outer surface of the separation layer, and having as a cathode, a cathode active material layer and a cathode current collector; and a protection coating surrounding the outer electrode.

In the present invention, the separation layer may be an electrolyte layer or a separator.

Advantageous Effects

In accordance with the present invention, the above-mentioned anode has a spiral anode consisting of several strands of anode wires being spirally twisted, and thus its anode active material layer has a thin thickness as compared with a single strand of an anode having the same anode active material. From this, Li ions can be easily diffused to enhance battery performance. Also, the anode of the present invention has an increased surface area to react with Li ions during a charging and discharging process, thereby improving the rate characteristics of a battery.

Further, the anode of the present invention has a conductive layer on the surface thereof to prevent or alleviate the release of an anode active material which is caused by volume expansion during charging and discharging processes, and to solve the isolation of the anode active material. In addition, the anode of the present invention has such a conductive layer to hinder the isolation of an anode active material and the formation of a new surface, thereby minimizing a side reaction with an electrolyte solution.

DESCRIPTION OF DRAWINGS

The accompanying drawing illustrates a preferred embodiment of the present invention and, together with the foregoing disclosure, serves to provide further understanding of the technical spirit of the present invention. However, the present invention is not to be construed as being limited to the drawings.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
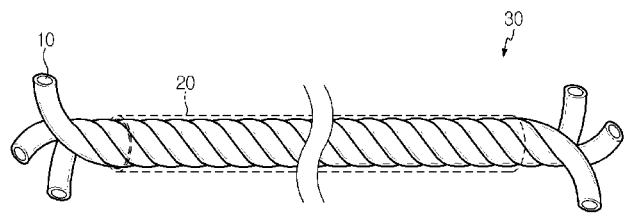
FIG. 1 is a perspective view schematically showing an anode according to a preferred embodiment of the present invention.
Figure 2:
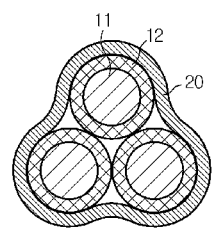
FIG. 2 is the cross-sectional view of FIG. 1.

FIGS. 1 and 2 schematically show an anode according to an embodiment of the present invention. However, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

Referring to FIGS. 1 and 2, the anode 30 of the present invention comprises a spiral anode having at least two anode wires 10 which are parallel to each other and spirally twisted, each of the anode wires having an anode active material layer 12 coated on the surface of a wire-type current collector 11; and a conductive layer 20 formed to surround the spiral anode.

The spiral anode 30 of the present invention is configured to have several strands of anode wires 10 being spirally twisted, and the twisting of several strands of anode wires is not particularly limited. For example, the twisted anode wires may be obtained by placing several strands of anode wires 10 side by side to be parallel to each other and then twisting them together, or by intercrossing several strands of anode wires 10 one after the other similar to braided long hair.

Generally, when a metal such as Si and Sn, or a compound containing such a metal, which exhibits electrochemical characteristics by being alloyed with Li ions or dealloying due to its inherent properties, is used as an anode material having high capacity, there is a severely large volume change due to expansion which may cause the secondary battery to decay. This volume change weakens the electronic contact between metal active materials, thereby inhibiting the transfer of Li ions into the anode active material layer to cause cycle deterioration. Also, the resistance of the battery becomes increased.

However, in the anode 30 of the present invention, several anode wires 10 in which an anode active material 12 is coated on the surface of a wire-type current collector 11 are twisted and spiraled to increase a surface area to react with Li ions during a charging and discharging process, thereby improving the rate characteristics of a battery. Also, the anode 30 of the present invention has a space present between the several strands of anode wires, which can release stress or pressure applied in the battery during a charging and discharging process, e.g., the expansion of active material layers, to prevent the deformation of the battery and ensure the stability thereof, thereby improving the life characteristic of the battery.

The anode 30 of the present invention has the conductive layer 20. Such a conductive layer 20 can act as a buffer capable of preventing or alleviating the release of a metallic anode active material which is caused by volume expansion during charging and discharging processes. Also, the conductive layer 20 comprises carbon particles having good conductivity to solve the isolation of the metallic anode active material. Thereby, the anode of the present invention can improve the initial efficiency and cycle characteristics of batteries.

A metal-based active material layer has low affinity with an organic electrolyte solution. Generally, metal-based active material layers has no pores therein and they do not comprise a binder capable of carrying an organic electrolyte solution, so it is difficult for the organic electrolyte solution to inflow into the metal-based active material layers. For these reasons, battery capacity is difficult to be ensured and battery resistance is apt to increase. In contrast, the conductive layer of the present invention has pores and comprises a binder, thereby facilitating the inflow of the organic electrolyte solution into the metal-based active material layer.

Also, since the anode of the present invention has such a conductive layer, it can hinder the isolation of the anode active material and the formation of a new surface to minimize a side reaction with an electrolyte solution.

In the present invention, the twist rate of the anode wires in the spiral anode is in the range of 0.01 to 10 mm per one twist. The twist rate is obtained by dividing the length of the anode wire by the number of twists. The lower value the twist rate has, the higher a twist degree is. When the twist rate is greater than 10 mm per one twist, a contact area between anode wires 10 is very small and the increase of surface area is insufficient. When the twist rate is lower than 0.01 mm per one twist, a twist degree becomes excessive causing damage of the anode wires 10, e.g., the peeling off of the anode active material layer and the rupture of the current collector.

The wire-type current collector 11 used in the present invention is not particularly limited to its kinds, and for example, it may be made of stainless steel, aluminum, nickel, titanium, sintered carbon, copper; stainless steel treated with carbon, nickel, titanium or silver on the surface thereof; an aluminum-cadmium alloy; a non-conductive polymer treated with a conductive material on the surface thereof; or a conductive polymer.

Also, the conductive material is not particularly limited to its kinds, and for example, it may be selected from polyacetylene, polyaniline, polypyrrole, polythiophene, polysulfur nitride, indium thin oxide (ITO), copper, silver, palladium, nickel and a mixture thereof.

In addition, the conductive polymer may be selected from polyacetylene, polyaniline, polypyrrole, polythiophene, polysulfur nitride and a mixture thereof, but is not limited thereto.

In the present invention, the anode active material layer may comprises any one selected from the group consisting of a metal (Me) selected from Si, Sn, Li, Zn, Mg, Cd, Ce, Ni and Fe; an alloy containing the metal (Me); an oxide ($MeO_x$) of the metal (Me); a composite of the metal (Me) and carbon; and a mixture thereof.

Also, the anode wires of the present invention may be one having a porous metal-based anode active material layer which may be formed on the surface of the current collector using an electroplating process or an anodizing process. The electroplating process is used in forming the active material layer on the surface of the current collector, in which hydrogen bubbles may be generated. By adjusting the amount and size of the hydrogen bubbles generated, a metal-based anode active material layer of a three-dimensional pore structure having a desired pore size may be formed. The anodizing process may be used in forming a metal oxide-containing anode active material layer on the surface of the current collector. In this case, by adjusting the amount generated and the size of oxygen bubbles that may be generated under anodizing conditions, a metal-based active material layer containing a metal oxide may be obtained in the form of a one-dimensional channel-shaped pore structure.

In the present invention, the conductive layer may comprise a mixture of carbon particles and a polymer binder. The carbon particles are not particularly limited to their kinds, and for example, they may be selected from the group consisting of carbon black, acetylene black, ketjen black, denka black, carbon fiber and a mixture thereof.

In addition, the polymer binder is not particularly limited to its kinds, and for example, it may be selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, styrene-butadiene rubber, carboxymethyl cellulose and a mixture thereof.

The anode of the present invention as mentioned above is used together with a cathode to form an electrode assembly, to which a separation layer is provided, to prepare a lithium secondary battery. The cathode and the electrolyte used to configure the electrode assembly may be any one which is conventionally used in the preparation of a lithium secondary battery.

The separation layer may be an electrolyte layer or a separator.

Hereinafter, a cable-type secondary battery comprising the anode of the present invention is briefly described for its specific structure with reference to FIGS. 3 and 4.

Figure 3:
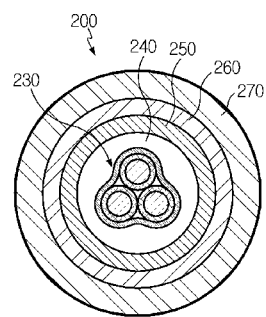
FIG. 3 is a cross-sectional view showing a cable-type secondary battery according to a preferred embodiment of the present invention.

Referring to FIG. 3, a cable-type secondary battery 200 according to the present invention has an inner electrode comprising the anode 230; a separation layer 240 surrounding the inner electrode and acting as a ion channel; an outer electrode as a cathode surrounding the outer surface of the separation layer, and having a cathode active material layer and a cathode current collector; and a protection coating 270 surrounding the outer electrode.

In the present invention, the separation layer may be an electrolyte layer or a separator.

The electrolyte which may be used in the present invention includes a gel polymer electrolyte of PEO, PVdF, PVdF-HFP, PMMA, PAN, or PVAc. Alternatively, the electrolyte may be a non-aqueous electrolyte solution containing ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone, sulfolane, methyl acetate (MA) or methyl propionate (MP). The electrolyte may further comprise a lithium salt such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate and lithium tetraphenylborate.

The separator is not limited to its kinds, and for example, it may be a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer. Among these, in order for the lithium ions of a core for supplying lithium ions to be transferred to the outer electrode, it is preferred to use a non-woven fabric separator corresponding to the porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes.

In such a cable-type secondary battery, the outer electrode as a cathode may be configured with a cathode current collector 260 and a cathode active material 250 applied thereto, more specifically, a structure having the cathode active material layer formed to surround the outer surface of the separation layer, and the cathode current collector formed to surround the outer surface of the cathode active material layer; a structure having the cathode current collector formed to surround the outer surface of the separation layer, and the cathode active material layer formed to surround the outer surface of the cathode current collector; a structure having the cathode current collector formed to surround the outer surface of the separation layer, and the cathode active material layer formed to surround the outer surface of the cathode current collector and to come into contact with the separation layer; or a structure having the cathode active material layer formed to surround the outer surface of the separation layer, and the cathode current collector formed to be included inside the cathode active material layer by being covered therein and to surround the outer surface of the separation layer with spacing apart therefrom.

The cathode current collector is not particularly limited to its kinds, but is preferably in the form of a pipe, a wound wire, a wound sheet or a mesh.

Also, the cathode current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste containing metal powders of Ni, Al, Au, Ag, Al, Pd/Ag, Cr, Ta, Cu, Ba or ITO; or a carbon paste containing carbon powders of graphite, carbon black or carbon nanotube.

In the present invention, the cathode active material is preferably a lithium-containing transition metal oxide, for example, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}M-n_yO_2$, $LiNi_{1-y}Mn_yO_2$ ($0 \leq y \leq 1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, $LiFePO_4$, and a mixture thereof. Also, a sulfide, selenide, or halide of such a lithium-containing transition metal may be used.

The outer electrode may comprise an outer electrode active material and an outer current collector. Such an outer electrode may be obtained by first forming the outer electrode active material layer on the outer current collector and then applying the separation layer thereon. For example, in the case of the wound sheet-form current collector, the outer electrode active material layer may be first formed on the wound sheet-form current collector, followed by cutting into a piece having a predetermined size, to prepare a sheet-form outer electrode. Then, the prepared sheet-form outer electrode may be wound on the outer surface of the separation layer so that the outer electrode active material layer comes into contact with the separation layer, to form the outer electrode on the separation layer.

As another method, in the formation of the outer electrode, the outer current collector may be first formed to surround the outer surface of the separation layer, and then followed by forming the outer electrode active material layer to surround the outer surface of the outer current collector.

Meanwhile, in the case of a structure having the outer current collector formed to surround the outer surface of the separation layer, and the outer electrode active material layer formed to surround the outer surface of the outer current collector and to come into contact with the separation layer, first, an outer current collector, for example, in the form of a wire or sheet, is wound on the outer surface of the separation layer. The winding method is not particularly limited. For example, in the case of the wire-form current collector, the winding may be carried out by using a winding machine on the outer surface of the separation layer. Then, the outer electrode active material layer is formed by way of coating on the outer surface of the wound wire- or sheet-form outer current collector so that the outer electrode active material layer surrounds the outer current collector and comes into contact with the separation layer.

Also, in the case of a structure having the outer electrode active material layer formed to surround the outer surface of the separation layer, and the outer current collector formed to be included inside the outer electrode active material layer by being covered therein and to surround the outer surface of the separation layer with spacing apart therefrom, first, on the outer surface of the separation layer, a part of the outer electrode active material layer to be finally obtained is formed, on which the outer current collector is formed to surround the part of the outer electrode active material layer, and then the outer electrode active material layer is further formed on the outer current collector to completely cover the outer current collector. Thereby, the outer current collector is disposed inside the outer electrode active material layer to improve an electric contact between the current collector and the active material, thereby enhancing battery characteristics.

The electrode active material, which is an anode active material or a cathode active material, is used together with a binder and a conductive material, and is combined with a current collector to configure an electrode. If the electrode is deformed by bending or severe folding due to external force, the electrode active material may be released. The release of the electrode active material deteriorates the performance and capacity of batteries. However, in the present invention, since the wound wire-form outer current collector has elasticity, it can disperse the applied force when such a deformation occurs by the external force, which causes only a slight deformation of the active material layer, thereby preventing the release of the active material.

Also, the cathode may be prepared by extrusion-coating an electrode slurry containing a cathode active material on a cathode current collector using an extruder. Also, the inner electrode may be the twisted anode 230 and it may be coated with the separation layer 240 on the outside thereof or inserted into the separation layer 240. Thus, the cable-type secondary battery may be prepared by forming the inner electrode and the separation layer 240 and then forming the outer electrode 250, 260 and a protective coating 270 thereon. Alternatively, the cable-type secondary battery may be prepared by forming the outer electrode 250, 260 including the separation layer 240 and the protective coating 270 and inserting the inner electrode in the separation layer 240; or forming the outer electrode 250, 260 and the protective coating 270, inserting the inner electrode and then filling the separation layer 240.

In the present invention, the protective coating is formed on the outer surface of the battery and acts as an insulator to protect the electrodes from moisture in air and external impact. The protective coating may be made of typical polymer resins, for example, PVC, high-density polyethylene (HDPE), or epoxy resin.

Figure 4:
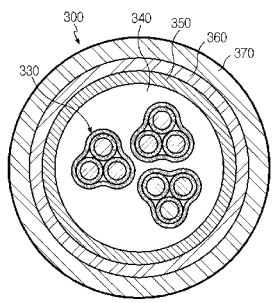
FIG. 4 is a cross-sectional view showing a cable-type secondary battery according to a preferred embodiment of the present invention.

Referring to FIG. 4, a cable-type secondary battery 300 according to one embodiment of the present invention comprises several anodes 330. Since such a cable-type secondary battery has multiple inner electrodes 330, a contact area increases to provide high battery rate. Also, the number of the inner electrodes may be adjusted, thereby easily controlling the capacity balance between the inner electrodes and the outer electrode.

Also, the cable-type secondary battery of FIG. 4 comprises an outer electrode, and the outer electrode may have a cathode active material layer formed to surround the outer surface of a separation layer, and a cathode current collector formed to surround the outer surface of the cathode active material layer, as mentioned above. In addition, the outer electrode may be formed in a structure having the cathode current collector formed to surround the outer surface of the separation layer, and the cathode active material layer formed to surround the outer surface of the cathode current collector; a structure having the cathode current collector formed to surround the outer surface of the separation layer, and the cathode active material layer formed to surround the outer surface of the cathode current collector and to come into contact with the separation layer; or a structure having the cathode active material layer formed to surround the outer surface of the separation layer, and the cathode current collector formed to be included inside the cathode active material layer by being covered therein and to surround the outer surface of the separation layer with spacing apart therefrom.

Hereinafter, the present invention will be described in detail through specific examples. However, the description proposed herein is just a preferable example for the purpose of illustrations only, not intended to limit the scope of the invention, so it should be understood that the examples are provided for a better explanation to an ordinary person skilled in the art.

EXAMPLE

Example 1

Preparation of Anode Having Graphite-Based Anode Composition Layer

On the surface of a wire-type Cu current collector having a diameter of 150 μm, a Sn—Ni layer having a thickness of 2.5 μm was formed, to obtain an anode wire having an anode active material coating layer. The same procedure was carried out to obtain a total of three strands of anode wires. The three strands of anode wires were twisted to prepare a spiral anode.

Then, a carbon fiber and PVdF were mixed in a weight ratio of 60:40, and the mixture was added to NMP as a solvent, to obtain a solution for a conductive layer. The resulting solution was coated on the outer surface of the spiral anode to prepare an anode.

Comparative Example 1

Preparation of Anode Having No Conductive Layer

On the surface of a wire-type Cu current collector having a diameter of 150 μm, a Sn—Ni layer having a thickness of 2.5 μm was formed, to obtain an anode wire having an anode active material coating layer. The same procedure was carried out to obtain a total of three strands of anode wires. The three strands of anode wires were twisted to prepare a spiral anode.

Experimental Example

Preparation of Coin-Type Half-Cell

A lithium foil was used as a cathode and each of the anodes prepared in Example 1 and Comparative Example 1 was used as an anode, and a polyethylene separator was interposed between the cathode and the anode, to obtain an electrode assembly. The electrode assembly was inserted in a battery case, to which an electrolyte solution containing 1M $LiPF_6$ dissolved in a mixed solvent of ethylene carbonate and diethyl carbonate (1:2 (vol %)) was introduced, to prepare a coin-type half-cell battery.

<Evaluation of Charging/Discharging Characteristics of Battery>

Figure 5:
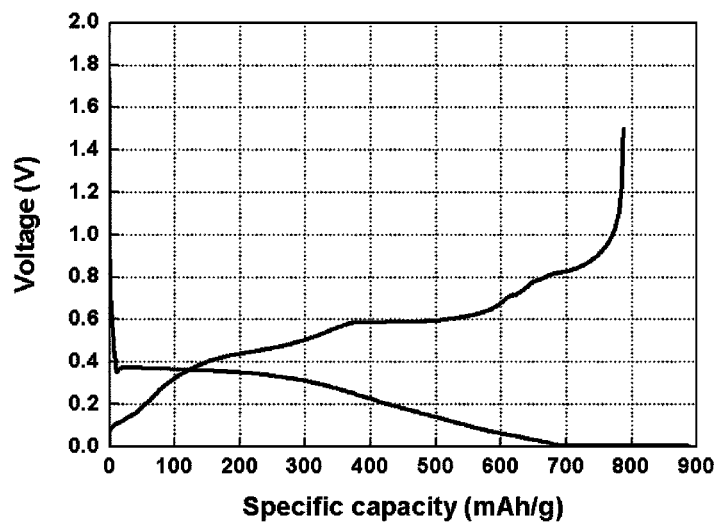
FIG. 5 is a graph showing the charging/discharging characteristic of the anode prepared in Example 1.
Figure 6:
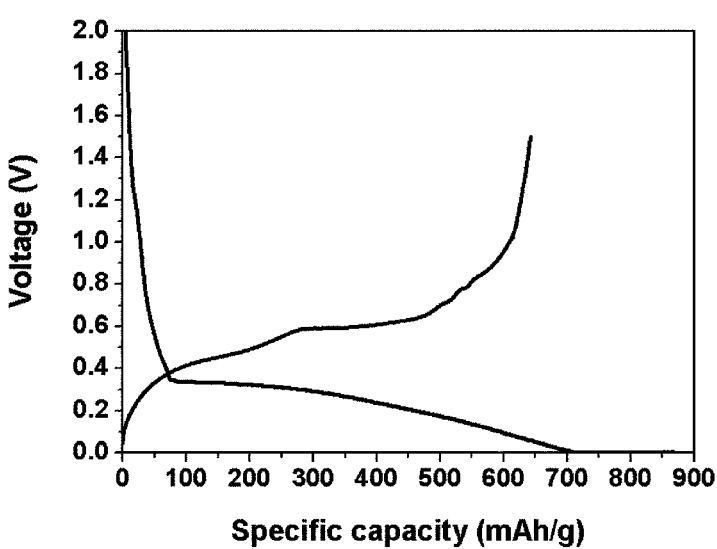
FIG. 6 is a graph showing the charging/discharging characteristic of the anode prepared in Comparative Example 1.

Each battery using each anode prepared in Example 1 and Comparative Example 1 was charged with a constant current of 0.1 C up to 5 mV and then with a constant voltage of 5 mV, and the charging process for each battery was completed when the charging current reached 0.005 C. Each battery was discharged with a constant current of 0.1 C up to 1.5 V. The charging/discharging was repeated 30 times under the same conditions, and then the charging/discharging characteristic of each battery was measured and shown in Table 1 and FIGS. 5 and 6.

TABLE 1

|  | $1^{st}$ cycle | | |
| --- | --- | --- | --- |
|  | Charging Capacity ($mAhg^{-1}$) | Discharging Capacity ($mAhg^{-1}$) | Initial Efficiency (%) |
| Ex. 1 | 887.8 | 787.9 | 88.7 |
| Com. Ex. 1 | 868.3 | 642.5 | 73.9 |

As can be seen from Table 1, the battery using the anode of Example 1 exhibited an initial efficiency of 88.7%, which is very higher than that (73.9%) of Comparative Example 1 having no conductive layer. Also, as can be confirmed from FIGS. 5 and 6, the anode of Example 1 provides superior capacity as compared with Comparative Example 1.

This improvement of the initial efficiency in Example 1 seems because an anode having a metal-based active material layer is provided with a conductive layer on the surface thereof and such a conductive layer can prevent or alleviate the release of an anode active material which is caused by the volume expansion of a metal-based active material and can improve the electrical conductivity of the anode.

EXPLANATION OF REFERENCE NUMERALS

10: Anode wire
11: Wire-type current collector
12: Anode active material layer
20: Conductive layer
30: Anode having conductive layer
200, 300: Cable-type Secondary Battery
230, 330: Anode having conductive layer
240, 340: Separation Layer
250,350: Cathode Active Material Layer
260, 360: Cathode Current Collector
270, 370: Protection Coating

What is claimed is:
1. An anode for a secondary battery, comprising:
a spiral anode having at least two anode wires which are parallel to each other and spirally twisted, each of the anode wires having an anode active material layer coated on the surface of a wire-type current collector; and
a conductive layer formed to surround the spiral anode.
2. The anode for a secondary battery according to claim 1, wherein the twist rate of the anode wires in the spiral anode is in the range of 0.01 to 10 mm per one twist.

3. The anode for a secondary battery according to claim 1, wherein the wire-type current collector is made of stainless steel, aluminum, nickel, titanium, sintered carbon, copper; stainless steel treated with carbon, nickel, titanium or silver on the surface thereof; an aluminum-cadmium alloy; a non-conductive polymer treated with a conductive material on the surface thereof; or a conductive polymer.

4. The anode for a secondary battery according to claim 3, wherein the conductive material is selected from polyacetylene, polyaniline, polypyrrole, polythiophene, polysulfur nitride, indium thin oxide (ITO), copper, silver, palladium, nickel and a mixture thereof.

5. The anode for a secondary battery according to claim 3, wherein the conductive polymer is selected from polyacetylene, polyaniline, polypyrrole, polythiophene, polysulfur nitride and a mixture thereof.

6. The anode for a secondary battery according to claim 1, wherein anode active material layer comprises an active material selected from the group consisting of a metal (Me) selected from Si, Sn, Li, Zn, Mg, Cd, Ce, Ni and Fe; an alloy containing the metal (Me); an oxide ($MeO_x$) of the metal (Me); a composite of the metal (Me) and carbon; and a mixture thereof.

7. The anode for a secondary battery according to claim 1, wherein the conductive layer comprises a mixture of carbon particles and a polymer binder.

8. The anode for a secondary battery according to claim 7, wherein the carbon particles are selected from the group consisting of carbon black, acetylene black, ketjen black, denka black, carbon fiber and a mixture thereof.

9. The anode for a secondary battery according to claim 7, wherein the polymer binder is selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, styrene-butadiene rubber, carboxymethyl cellulose and a mixture thereof.

10. A secondary battery comprising a cathode, an anode and a separation layer, wherein the anode is the anode according to claim 1.

11. The secondary battery according to claim 10, wherein the separation layer is an electrolyte layer or a separator.

12. A cable-type secondary battery, comprising:
an inner electrode having at least one anode for a secondary battery according to claim 1;
a separation layer surrounding the inner electrode and acting as an ion channel;
an outer electrode acting as a cathode and surrounding the outer surface of the separation layer, and having a cathode active material layer and a cathode current collector; and
a protection coating surrounding the outer electrode.

13. The cable-type secondary battery according to claim 12, wherein the separation layer is an electrolyte layer or a separator.

14. The cable-type secondary battery according to claim 13, wherein the electrolyte layer comprises an electrolyte selected from a gel polymer electrolyte using PEO, PVdF, PVdF-HFP, PMMA, PAN, or PVAc; and a solid electrolyte using PEO, polypropylene oxide (PPO), polyethylene imine (PEI), polyethylene sulphide (PES), or polyvinyl acetate (PVAc).

15. The cable-type secondary battery according to claim 13, wherein the electrolyte layer further comprises a lithium salt.

16. The cable-type secondary battery according to claim 15, wherein the lithium salt is selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

17. The cable-type secondary battery according to claim 13, wherein the separator is a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

18. The cable-type secondary battery according to claim 12, wherein in the outer electrode,
the cathode active material layer is formed to surround the outer surface of the separation layer, and the cathode current collector is formed to surround the outer surface of the cathode active material layer;
the cathode current collector is formed to surround the outer surface of the separation layer, and the cathode active material layer is formed to surround the outer surface of the cathode current collector;
the cathode current collector is formed to surround the outer surface of the separation layer, and the cathode active material layer is formed to surround the outer surface of the cathode current collector and to come into contact with the separation layer; or
the cathode active material layer is formed to surround the outer surface of the separation layer, and the cathode current collector is formed to be included inside the cathode active material layer by being covered therein and to surround the outer surface of the separation layer with spacing apart therefrom.

19. The cable-type secondary battery according to claim 12, wherein the cathode current collector is in the form of a pipe, a wound wire, a wound sheet or a mesh.

20. The cable-type secondary battery according to claim 12, wherein the cathode current collector is made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste containing metal powders of Ni, Al, Au, Ag, Al, Pd/Ag, Cr, Ta, Cu, Ba or ITO; or a carbon paste containing carbon powders of graphite, carbon black or carbon nanotube.

\* \* \* \* \*